US006800696B2

(12) United States Patent
Saito

(10) Patent No.: US 6,800,696 B2
(45) Date of Patent: Oct. 5, 2004

(54) METHOD FOR PRODUCING COPOLYMER OF ALKYLVINYL ETHER AND MALEIC ANHYDRIDE, AND COPOLYMER OF ALKYLVINYL ETHER AND MALEIC ANHYDRIDE

(75) Inventor: Morihito Saito, Iwakuni (JP)

(73) Assignee: Daicel Chemical Industries, Ltd., Sakai (JP)

(*) Notice: Subject to any disclaimer, the term of this patent is extended or adjusted under 35 U.S.C. 154(b) by 0 days.

(21) Appl. No.: 10/754,979

(22) Filed: Jan. 9, 2004

(65) Prior Publication Data

US 2004/0143080 A1 Jul. 22, 2004

Related U.S. Application Data

(62) Division of application No. 10/033,673, filed on Dec. 28, 2001.

(30) Foreign Application Priority Data

Dec. 28, 2000 (JP) ........................... 2000-403162

(51) Int. Cl.[7] ................................. C08F 120/08
(52) U.S. Cl. .................... 525/327.6; 526/271; 526/332; 525/328.9
(58) Field of Search ............... 525/327.6, 328.9; 526/271, 332

(56) References Cited

U.S. PATENT DOCUMENTS

| | | | | |
|---|---|---|---|---|
| 2,782,182 A | 2/1957 | Verburg et al. | ............ | 260/78.5 |
| 3,030,343 A | 4/1962 | Jones et al. | ............ | 260/78.5 |
| 3,499,876 A | 3/1970 | Field et al. | ............ | 260/78.5 |
| 3,532,771 A | 10/1970 | Field et al. | ............ | 260/875 |
| 3,553,183 A | 1/1971 | Field et al. | ............ | 260/78.5 |
| 4,900,809 A | 2/1990 | Tazi et al. | ............ | 528/497 |
| 4,939,198 A | 7/1990 | Tazi et al. | ............ | 524/379 |
| 4,948,848 A | 8/1990 | Tazi et al. | ............ | 526/78 |
| 4,952,558 A | * 8/1990 | Goertz et al. | ............ | 526/271 |
| 5,034,487 A | 7/1991 | Tazi et al. | ............ | 526/271 |

FOREIGN PATENT DOCUMENTS

| | | | |
|---|---|---|---|
| DE | 3108100 | 1/1983 | |
| DE | 3302495 | 7/1985 | |
| DE | 3736996 | 8/1990 | |
| DE | 3712265 | 9/1991 | |
| GB | 906230 | 9/1962 | |
| GB | 1117515 | 6/2002 | |
| JP | 55145714 | 11/1980 | |
| JP | 1204910 | 8/1989 | |
| JP | 1204911 | 8/1989 | |
| JP | 1204912 | 8/1989 | |
| JP | 4504869 | 3/1990 | |
| JP | 3215509 | 9/1991 | ......... C08F/222/06 |
| JP | 2000191705 | 7/2000 | ............ C08F/2/00 |
| JP | 3221511 | 10/2001 | |
| WO | WO 90/12817 | 9/1990 | |
| WO | WO 90/12036 | 10/1990 | |
| WO | WO 92/02564 | 2/1992 | ........... C08F/16/16 |

* cited by examiner

Primary Examiner—Helen L. Pezzuto
(74) Attorney, Agent, or Firm—Morgan & Finnegan, LLP

(57) ABSTRACT

In the first aspect of the present invention, there is disclosed a method for producing a copolymer of an alkyl vinyl ether and maleic anhydride which comprises removing an organic solvent used in a reaction under a temperature so that a slurry state can be maintained. According to the first aspect, such a copolymer of the alkyl vinyl ether and maleic anhydride which contains a little amount of the solvent remaining therein as disclosed in the second aspect of the present invention, can be obtained.

Further, it can be avoided that a specific viscosity of the copolymer of the alkyl vinyl ether and maleic anhydride is lowered, by means of a method for producing a copolymer of alkyl vinyl ether and maleic anhydride which comprises shielding oxygen in a polymerization, as disclosed in the third aspect of the present invention.

7 Claims, 2 Drawing Sheets

METHOD FOR PRODUCING COPOLYMER OF ALKYLVINYL ETHER AND MALEIC ANHYDRIDE, AND COPOLYMER OF ALKYLVINYL ETHER AND MALEIC ANHYDRIDE

CROSS-REFERENCE TO RELATED APPLICATIONS

This application is a divisional of U.S. patent application Ser. No. 10/033,673, filed Dec. 28, 2001, now US 2002/0086964.

FIELD OF THE INVENTION

The present invention relates to a method for producing a copolymer of an alkyl vinyl ether and maleic anhydride, and also relates to a copolymer of an alkyl vinyl ether and maleic anhydride. More specifically, the present invention relates to a method for producing the copolymer by the use of a non-benzene base solvent, the copolymer thus-obtained being a finely solidified copolymer containing a little amount of a solvent remained therein, and also relates to the copolymer containing a little amount of a solvent remained therein.

Further, the present invention relates to a method for producing the copolymer by conducting a heating, in posterior processes to a polymerization process such as a drying process, under the absence of oxygen, the copolymer thus obtained being featured by that a specific viscosity thereof will not be lowered.

BACKGROUND OF THE INVENTION

A copolymer of an alkyl vinyl ether/maleic anhydride, in particular, a copolymer of methyl vinyl ether/maleic anhydride is a straight chain and water-soluble polymeric electrolyte compound, and recently, has been widely put into use in such industrial fields as additives to a sticking agent (a sticking plaster), an adhesive, a preventive agent for adhesion of detergents, a spray-type fixing agent for hair, a builder for synthetic detergents, a dental material or the like, because the copolymer is excellent in nonpoisonous properties to the human body, stability for a long period of time, tackiness, cohesiveness, a water-holding property, a peeling property and the like. Further, an esterification-product of the maleic anhydride portion in the copolymer, obtained by reacting the copolymer with various alcohols, is also used in such fields.

Heretofore, it has been well known that an alkyl vinyl ether is copolymerized with maleic anhydride in various solvents, in the presence of a radical initiator, to afford a copolymer of alkyl vinyl ether/maleic anhydride. In this case, such a reaction method as to effect a precipitation-polymerization in a solvent which can dissolve a raw material maleic anhydride but can not dissolve the copolymer of alkyl vinyl ether/maleic anhydride, and as to effect a solution-polymerization in a solvent which can dissolve both of the raw material maleic anhydride and the copolymer of an alkyl vinyl ether/maleic anhydride have been well known.

Examples of the precipitation-polymerization method include a method to effect a reaction using, as a solvent, an aromatic hydrocarbon such as benzene (e.g., U.S. Pat. Nos. 2,782,182, 3,030,343, 3,499,876, 3,532,771, 3,553,183, DE3302495, JP-A-01204910, JP-A-01204911, and JP-A-01204912; 4,900,809 etc.), toluene or xylene (U.S. Pat. Nos. 3,499,876, 3,532,771, 3,553,183, DE3302495, JP-A-01204910, JP-A-01204911 and JP-A-01204912 etc.); an aliphatic hydrocarbon such as hexane, heptane or octane (U.S. Pat. No. 3,532,771); a halogenated aliphatic hydrocarbon such as dichloroethane (GB 1117515, U.S. Pat. No. 3,499,876, DE3302495 etc.), trichloroethane, carbon tetrachloride (DE3302495) or a mixture of 1,2-trichloro-1,2,2-trifluoroethane/dichloromethane (JP-A-55145714); ester such as an ester having not less than 5 of carbon atoms (DE3736996), isopropyl acetate or methyl propionate (JP-A-01204910, JP-A-01204911 and JP-A-01204912); and ether such as allyl vinyl ether (GB 906230, DE-3712265, DE-3108100) or a monoether which is sterically bulky (WO-9012817).

Examples of the solution-polymerization method include a method to effect a reaction using, as a solvent, methyl acetate, ethyl acetate (U.S. patent application Ser. No. 334404), acetone (U.S. Pat. Nos. 3,499,876, 4,948,848), methyl ethyl ketone (U.S. Pat. No. 3,499,876) and the like.

However, it has been difficult to get near zero with respect to a solvent concentration remaining in a final product, even though drying of the copolymer solution of an alkyl vinyl ether/maleic anhydride is carefully conducted in a drying process after completion of polymerization thereof, in case when a polymerization reaction is carried out, at a usual temperature, by the use of a harmless solvent to the human body such as an organic acid ester like ethyl acetate or such as a ketone base solvent like methyl ethyl ketone, in a usual technology, in place of a harmful solvent such as benzene, toluene, xylene, carbon tetrachloride, dichloroethane or trichloroethane.

In case when a detergent, a sticking agent or a fixing agent for hair, to which a copolymer of an alkyl vinyl ether/maleic anhydride has been added, is employed, these agents directly come in contact with the human body (the skin etc.). Accordingly, it has been demanded to develop a reaction method to use a solvent which is harmless to the human body, even if the above-mentioned agents come in contact with the human body, and demanded also to be able to decrease concentration of a solvent remaining in a final product. Reaction methods using solvents other than the aforesaid solvents are also known. It is, however, noted that these methods bring about such drawbacks as described in the following.

For example, when such an ester as ethyl formate, isopropyl acetate, butyl acetate or methyl propionate is used, a copolymer produced during a reaction will become liable to adhere to the wall of a reaction vessel, which causes a problem in handling. On the other hand, when a reaction is conducted by a solution-polymerization method using methyl acetate, ethyl acetate, acetone, methyl ethyl ketone or the like as disclosed in the foregoing prior arts, a lot of energy will be required in removal of a solvent as compared with the case of a precipitation-polymerization method. As to a reaction method, using such an expensive solvent as a mixture of 1,1,2-trichloro-1,2,2-trifluoroethane/dichloromethane, monoether which is sterically bulky, or allyl vinyl ether, it can be said that the method will pose a cost problem in view of some losses inevitably derived in case of a solvent removal. Further, when only an aliphatic hydrocarbon such as hexane, heptane or octane is used, a monomer will become difficult to be dissolved in a solvent and a reaction will become difficult to proceed, accordingly.

Furthermore, in case of a method for producing a powdery copolymer of methyl vinyl ether/maleic anhydride using ethyl acetate or acetone as disclosed in JP-A-04504869 Official Gazette, it is necessary to use too much excessive methylvinyl ether with respect to the maleic anhydride in order to maintain a slurry state, and therefore, it is required to spend a lot of cost in a compressed reaction system and in recovery or re-use of the too much excessive methyl vinyl ether, which can be said that the method is problematic.

The present inventors proposed a method for producing a copolymer of methyl vinyl ether/maleic anhydride having a high specific viscosity as disclosed in JP-A-12191705 Official Gazette. In the method, the copolymer having a high specific viscosity is produced, by employing a divided and dropwise adding way of alkyl vinyl ether into the raw material maleic anhydride preliminarily dissolved in a solvent such as benzene. Namely, in the method, the contact time between the maleic anhydride and the copolymer of methyl vinyl ether/maleic anhydride is taken into consideration, and basically speaking, the method is a precipitation-polymerization to use a benzene series solvent.

However, an idea to precipitate a copolymer, using a solvent which dissolves the copolymer of an alkyl vinyl ether/maleic anhydride, and making use of a phenomenon that the solubility of copolymer lowers by means of heating, after completion of the polymerization, has never been disclosed in any of the prior arts, and it can be said that the method according to the present invention is an epoch-making one.

As to the copolymer of an alkyl vinyl ether/maleic anhydride which has been used in various objects as mentioned hereinbefore, a suitable molecular weight range thereof is selected according to the objects. However, the molecular weight thereof is low on the whole, and it has been desired to get a high molecular weight copolymer in order to improve performances for each different use.

As to the method for producing a copolymer of an alkyl vinyl ether/maleic anhydride, a variety of means has been disclosed so far, and for example, JP-A-03221511, JP-A-3215509, JP-A-5509341, and JP-A-12191705 Official Gazettes are cited in addition to the hereinbefore mentioned related arts. However, all of these means is concerned with proposed conditions for a reaction process, and does not disclose any of a removing method for solvents used in the reaction, and a method for drying and the like.

SUMMARY OF THE INVENTION

Accordingly, an object of the present invention is to provide a method to solve the above-noted problems, that is, to provide a novel method capable of producing a copolymer of an alkyl vinyl ether/maleic anhydride in a finely solidified state, by preventing the wall of a reaction vessel from adhesion of the copolymer to be produced, basically in a single solvent which is inexpensive and harmless to the human body, using a precipitation-polymerization method, and also to provide a copolymer which contains a little amount of solvents remained therein.

Other object of the present invention is to provide a method for producing a copolymer, by polymerizing an alkyl vinyl ether/maleic anhydride, in the presence of a solvent, using a polymerization initiator to obtain a copolymer having a high specific viscosity and after that, the high specific viscosity thereof can be maintained without being lowered.

BRIEF DESCRIPTION OF THE DRAWING

The objects, features, and advantages of the present invention will become more apparent from the following description of the preferred embodiments taken in conjunction with the accompanying FIGS. 1 to 3, in which.

DETAILED DESCRIPTION OF THE INVENTION

Figure 1:
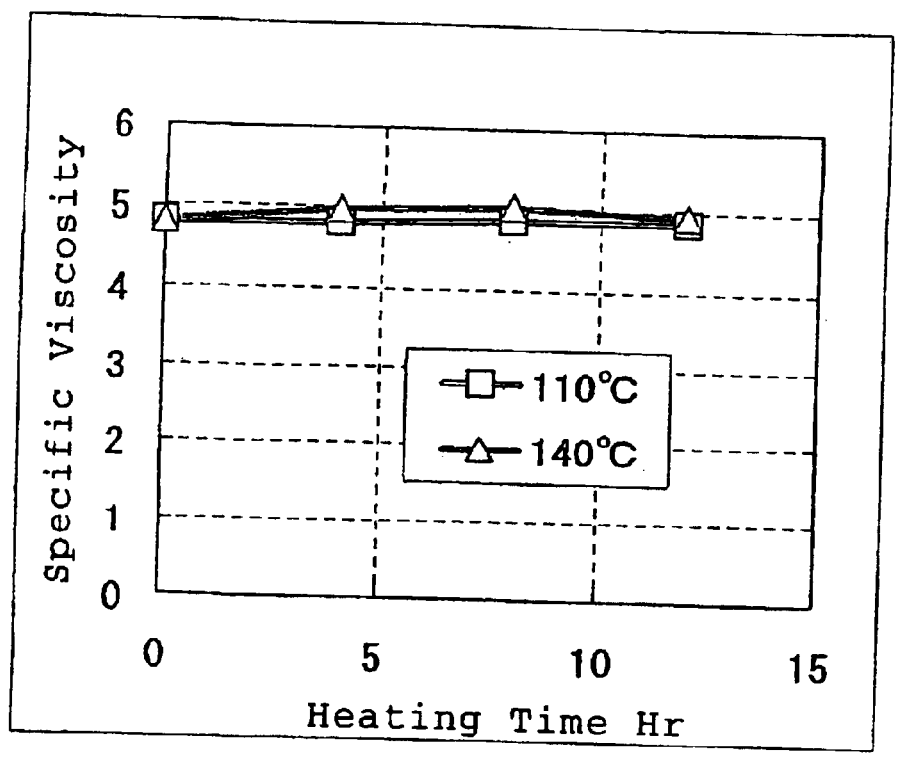
FIG. 1 is a graph showing a relationship between heating time and specific viscosity of the copolymer of methyl vinyl ether/maleic anhydride, at 110° C. and 140° C., respectively, under substantial absence of oxygen.

The present inventors have paid attention to the fact that solubility of a copolymer of an alkyl vinyl ether/maleic anhydride, more specifically, methyl vinyl ether/maleic anhydride, in a solvent of carboxylic acid ester, more specifically, in a solvent of ethyl acetate will change depending on the various temperatures.

Namely, around the room temperature, the copolymer of methyl vinyl ether/maleic anhydride dissolves perfectly in ethyl acetate, but at a temperature of about 40° C. or higher, an insoluble constituent in the copolymer will start deposition, and at a temperature of about 60° C. or higher, the copolymer and ethyl acetate will be in a state of almost separation. Further, at a temperature of 70° C. or higher, separation of the solid and the liquid will be completed. The present inventors have noticed such a featured phenomenon and have tried to apply the feature, thereby, finding out that the copolymer of an alkyl vinyl ether/maleic anhydride can be produced in a solid state by using only an ethyl acetate solvent without use of excessive methyl vinyl ether. The present invention has been accomplished based on the above-mentioned findings and information.

Further, the present inventor has carried out an intensive research and investigation in order to solve the aforementioned problems of a polymeric product, and has found out that, even if a copolymer of an alkyl vinyl ether/maleic anhydride having a high specific viscosity has been synthesized in a reaction process, the specific viscosity will become liable to remarkably change by heating the copolymer in the presence of oxygen, when solvents are removed under a reduced pressure and heated conditions in a drying process, and then, the present inventor has continued to study a relationship of an oxygen concentration with a heating temperature and a heating time, and also a removing method of oxygen, a reducing method of molecular weight or the like. As a result, the present invention has been accomplished.

That is, the first aspect of the present invention provides a method for producing a copolymer of an alkyl vinyl ether/maleic anhydride, by using a solution supplying type slurry-polymerization method which comprises the steps of:

(i) feeding an organic solvent which dissolves the copolymer to be produced and maleic anhydride into a reaction vessel, and then, heating a homogeneous maleic anhydride solution formed;

(ii) feeding an alkyl vinyl ether into the reaction vessel and copolymerizing it with maleic anhydride in the presence of a free radical initiator to produce a copolymer and to form a slurry in which the copolymer is suspended in a reaction solvent; and (iii) removing the organic solvent used in the reaction under the condition of a temperature-range so that the slurry can be maintained.

The second aspect of the present invention provides a copolymer of an alkyl vinyl ether/maleic anhydride containing 0.5% or less, preferably 0.2% or less, more preferably 0.1% or less of an amount, remained in the copolymer, of a solvent which dissolves the copolymer of an alkyl vinyl ether/maleic anhydride, or the solvent and a bad solvent to the copolymer.

Further, the third aspect of the present invention provides a method for producing a copolymer of an alkyl vinyl ether/maleic anhydride which comprises copolymerizing an alkyl vinyl ether with maleic anhydride in a polymerization process, in the presence of a solvent, using a polymerization-initiator, and after obtaining the copolymer, heating of the resultant copolymer, in posterior processes to the polymerization process, is carried out in a substantial absence of oxygen.

Since a specific viscosity value as called in the present invention will be raised with increase of a molecular weight, with respect to a polymer having the same structure unit, the value is widely used as a standard to relatively indicate the molecular weight of a polymer, and the specific viscosity used in the present invention has the same meaning with a molecular weight. A method for measuring the specific viscosity will be described below.

That is, a copolymer to be measured for a specific viscosity is dissolved in methyl ethyl ketone which is a solvent to prepare a solution having a concentration of 1% (weight/volume %, at 20° C.), and then, the falling time at 25° C. is measured using a capillary tube prescribed in JIS K6726 to calculate the specific viscosity in accordance with the calculation-formula; specific viscosity =(A−B)/B, wherein A=measured value of falling time for a copolymer solution, and B=measured value of falling time for a solvent alone.

In the following, the first aspect of the present invention, "A method for producing a copolymer of an alkyl vinyl ether and maleic anhydride", will be described in detail.

In the present invention, maleic anhydride and an alkyl vinyl ether such as methyl vinyl ether as a raw material, polymerization initiators, and solvents are used, and bad solvents may be occasionally and optionally used, if necessary, also in the third aspect of the present invention. No particular limitation is put on the methods for producing maleic anhydride and an alkyl vinyl ether as a raw material, or on the qualities thereof, and high purity grade ones or industrial grade ones thereof may be used.

The reaction formula in case of production for a copolymer of an alkyl vinyl ether/maleic anhydride is shown as follows.

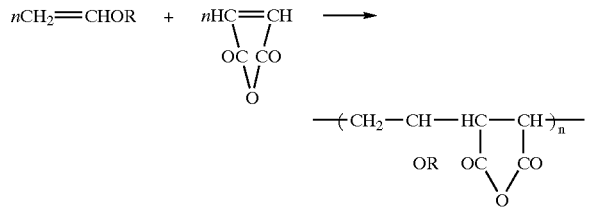

In the formula, "n" ranges in 10 to 100000, and can be controlled by regulating a feeding amount of the polymerization-initiator, an feeding rate of an alkyl vinyl ether, a polymerization temperature, and an adding amount of a chain transfer agent. In the formula, R has 1 to 4 of carbon atoms and denotes a straight chain, a branched chain and a cycloaliphatic hydrocarbon group.

In the first aspect of the present invention, the copolymerization may be conducted by a continuous system, but it is preferable to adopt a semi-batch system to feed maleic anhydride into a reaction vessel as a starting raw material monomer, and then, to feed a radical polymerization initiator and an alkyl vinyl ether into the reaction vessel continuously or intermittently during a reaction.

In case of a precipitation-polymerization, a copolymer of an alkyl vinyl ether/maleic anhydride will be precipitated along with the progress of a reaction, and therefore, it is possible to obtain a final product by filtering and drying the precipitated copolymer. After completion of the copolymerization, the copolymer will be once cooled to a room temperature or thereabouts to make it in a transparent solution-state, followed by reheating thereof to precipitate a copolymer, thereby making it possible to preferably obtain a nontacky product in a slurry state.

In the first aspect of the present invention, it is characterized in that a copolymerization is carried out using only a carboxylic acid ester as a solvent and subsequently, the carboxylic acid ester used will be removed under a specified temperature. Herein, the carboxylic acid ester is composed of a lower saturated aliphatic carboxylic acid and a saturated monovalent alcohol. The lower saturated aliphatic carboxylic acid is exemplified by formic acid, acetic acid, propionic acid, butyric acid or the like, and the saturated monovalent alcohol is exemplified by a straight chain alcohol and a branched chain alcohol having 1 to 5 of carbon atoms.

The usable carboxylic acid esters are exemplified by methyl formate, ethyl formate, n-propyl formate, isopropyl formate, n-butyl formate, isobutyl formate, tert-butyl formate, sec-butyl formate, pentyl formate, and various isomers thereof, methyl acetate, ethyl acetate, n-propyl acetate, isopropyl acetate, n-butyl acetate, isobutyl acetate, tert-butyl acetate, sec-butyl acetate, pentyl acetate, and various isomers thereof, methyl propionate, ethyl propionate, n-propyl propionate, isopropyl propionate, n-butyl propionate, isobutyl propionate, tert-butyl propionate, sec-butyl propionate, pentyl propionate, and various isomers thereof, methyl butyrate, ethyl butyrate, n-propyl butyrate, isopropyl butyrate, n-butyl butyrate, isobutyl butyrate, tert-butyl butyrate, sec-butyl butyrate, pentyl butyrate, and various isomers thereof and the like.

These solvents may be used alone or in combination with at least one other, but it is preferable to use a unitary solvent in view of difference of the physical properties thereof, solvent management, intricated recovery process of the solvent or the like. Of these solvents, it is most preferable to use ethyl acetate which is widely used, easy to obtain, inexpensive and nonpoisonous. In addition, in the first aspect of the present invention, the slurry state to be formed can be further improved by adding a specified amount of bad solvent at some point after completion of the copolymerization. The usable bad solvents are exemplified by an aromatic hydrocarbon, which is replaced with an alkyl group such as toluene and an aliphatic hydrocarbon such as n-hexane, n-heptane, or cyclohexane, and these are properly selected in consideration of solvent properties, heating temperature, concentration in case of the polymerization and the like.

There is no limitation on adding time of the bad solvents, as far as the adding is made after polymerization of the copolymer is completed. Namely, it may be added either before removal of solvents or in the midst of the removal. An adding amount of the bad solvents is dependent on the amount or kind of the poor solvents, but it is usually adopted in the range of 10 to 50% by weight, preferably 20 to 40% by weight, more preferably 30% by weight or thereabouts based on the amount of solvents remaining in the system. Either the adding amount of bad solvents is too much or a too little gives a bad and meaningless effect.

Next, other conditions in the first aspect of the present invention will be described. The alkyl vinyl ether used in the first aspect is represented by the general formula.

In the formula, R denotes a straight, branched or cycloaliphatic hydrocarbon group having 1 to 4 of carbon atoms.

Specific examples thereof include methyl vinyl ether, ethyl vinyl ether, n-propyl vinyl ether, isopropylvinyl ether, n-butyl vinyl ether, isobutyl vinyl ether, tert-butylvinyl ether, sec-vinylether or the like. Of these, methyl vinyl ether is easy to obtain and favorable.

Polymerization may be conducted under a normal pressure or a compressed condition using a sealed vessel. Polymerization temperature depends on the kind of a carboxylic acid ester used as a solvent, but it is preferable to conduct a polymerization at an appropriate temperature in the range of 40 to 120° C., preferably 50 to 90° C., in case when ethyl acetate is used. Incidentally, a boiling point at normal pressure of the most preferable solvent, i.e., ethyl acetate is in the vicinity of 72° C., and it is necessary to properly compress or reflux ethyl acetate during a reaction, in case when the polymerization is effected at about or higher than the boiling point.

There are many kinds of polymerization initiators, but organic peroxide base compounds or azo compounds are conventionally employed for their easy handling. Reactivity of the polymerization initiators is generally represented by a "half-value period" thereof. Of the polymerization initiators, an initiator having the one hour half-value period of 60 to 100° C. is preferably used. Since an initiator having the half-value period of lower than 60° C. has a low decomposition temperature and is very active, it is, therefore, necessary to have the polymerization initiator refrigerated or frozen, and further, to handle it paying a careful attention during storage thereof. A polymerization initiator having the one hour half-value period of higher than 100° C. is very slow in its decomposition rate, and takes a long time of period for polymerization to produce a copolymer of an alkyl vinyl ether/maleic anhydride at an appropriate polymerization-temperature, and accordingly, it is not practical.

As an initiator having the one hour half-value period of 60 to 100° C., mention is made, for example, of benzoyl peroxide, 4-chlorobenzoyl peroxide, 2,4-dichlorobenzoyl peroxide, 2-methylbenzoyl peroxide, octanoyl peroxide, decanoyl peroxide, lauroyl peroxide, stearoyl peroxide, tert-butyl peroxypivalate, tert-butyl peroxy-2-ethylhexanate, tert-butyl peroxyneodecanate, tert-butyl peroxyisobutyrate, bis(2-ethylhexyl) peroxydicarbonate, bis(4-tert-butylcyclohexyl) peroxydicarbonate, diisopropyl peroxydicarbonate, di-sec-butyl peroxydicarbonate, diisopropyl benzenehydroperoxide, 2,2'-azobisisobutyronitrile, 2,2-azobis-2,4-dimethylvaleronitrile, 2,2'-azobis-4-methoxy-2,4-dimethylvaleronitrile or the like. Among them, lauroyl peroxide and tert-butyl peroxypivalate are preferably used, because both of the two are easy to obtain and have a suitable one-hour half-value period.

An amount of the organic solvents to be used for polymerization is preferably 1:5 to 1:30 by weight, more preferably 1:5 to 1:20 by weight in the ratio of maleic anhydride/organic solvent. When the ratio is 1:5 or less, viscosity of the obtained copolymer of an alkyl vinyl ether/maleic anhydride will become exceedingly high, because the copolymer solution dispersed in an organic solvent is a high solid content, which gives rise to inconvenience to a slurry-liquid transportation or the like. When the ratio is 1:30 or more, a solid concentration contained in an organic solvent dispersion will become low, and it is expected that productivity based on a batch will be worsened and molecular weight of the copolymer obtained will be lowered, accordingly.

Total amount of the free radical initiators to be used in the polymerization is preferably in the range of about 0.005% to 0.5% by weight, more preferably in the range of about 0.01% to 0.2% by weight based on maleic anhydride. When the total amount is less than about 0.005% by weight, a reaction time will be long and productivity will undesirably be worsened. When the total amount exceeds about 0.5% by weight, an amount of the polymerization initiators remained in the product will undesirably be increased.

An amount of the alkyl vinyl ether to be used is preferably about 1:0.6 to 1:3.0 by weight, more preferably about 1:1 to 1:2.5 by weight in the ratio of a maleic anhydride/alkyl vinyl ether. When the ratio is less than about 1:0.6, a molar number of the alkyl vinyl ether will be lowered than that of the maleic anhydride, and then, it is expected that polymerization of the maleic anhydride will not be completed to lengthen the polymerization time. On the other hand, when the ratio exceeds 1:3.0, an amount of the alkyl vinyl ether, which does not participate in the reaction and evaporates from the surface of liquid phase, will be increased, it being unfavorable from the economical point of view.

In case when an organic solvent, and a bad solvent optionally used, are removed from the copolymer solution produced by copolymerizing maleic anhydride dissolved in an organic solvent with an alkyl vinyl ether in the presence of a free radical initiator, it is preferable to remove the organic solvent while keeping a temperature in the range of 50 to 85° C., more preferably in the range of 70 to 85° C. Stated differently, it is more preferable to remove the organic solvent in the range of temperature at which the copolymer produced will not be dissolved again.

The temperature lower than 50° C. results in that the copolymer of an alkyl vinyl ether/maleic anhydride produced is dissolved in the organic solvent, and that the copolymer properties, after removal of the organic solvent, shows a form or shape like a continuous resin layer and adheres to the wall or the like in a reaction vessel. Namely, the properties thereof become very difficult to handle as compared with the powdery copolymer, and further, concentration of the organic solvent remained in the copolymer resin increases undesirably. On the other hand, the heating over 85° C. only consumes heat energy and comes to be useless.

After the completion of the polymerization, the organic solvent, and the bad solvent optionally used, are removed to obtain the final product, a copolymer of an alkyl vinyl ether/maleic anhydride. According to the first aspect of the present invention, it is possible to decrease the concentration of organic solvent, and bad solvent optionally used, remaining in the final product up to 0.5% by weight, preferably up to 0.2% by weight, more preferably up to 0.1% by weight, as such a product described in the second aspect of the present invention. Meanwhile, progress rate of the polymerization reaction can be monitored by an analysis for maleic anhydride using a gas chromatography.

In practice, a molecular weight of the copolymer of an alkyl vinyl ether/maleic anhydride, described in the present invention, can relatively be confirmed by referring to the specific viscosity measured in methylethyl ketone. The specific viscosity of the alkyl vinyl ether/maleic anhydride copolymer according to the present invention usually ranges in 1.0 to 8.0, desirably 2.0 to 6.0, more desirably 2.5 to 5.0. A method for measuring the specific viscosity will be described as follows.

One % concentration (weight/volume, at 25° C.) of the copolymer solution in methylethyl ketone is prepared, and a falling time at 25 ° C. is measured using a capillary viscometer prescribed in JIS K6726. The specific viscosity is calculated using the following formula.

A specific viscosity=$(A-B)/B$

In the formula, "A" is a measured value of the falling time with respect to the copolymer solution, and "B" is a measured value with respect to the solvent.

The copolymer after completion of polymerization is taken out in a slurry state from the reaction vessel, and is subjected to filtration process (may contain a centrifugal separation), drying process or the like, thus obtaining a finely solidified and dried copolymer product. Further, the present invention may be applied to a method for producing a high purity product by refining a low purity product on the market and so on.

Next, the third aspect of the present invention, "a method for producing a copolymer of an alkyl vinyl ether/maleic anhydride", will be described.

In the third aspect of the present invention, no specific limitation is put on the solvents to be used in case of the polymerization of the copolymer, if the solvents dissolve alkyl vinyl ether and maleic anhydride as a monomer, and a polymerization initiator. In order to make easy the separation of copolymer to be obtained, solvents which are not a good solvent for the copolymer are preferably utilized. As such the solvents, mention is made, for example, of an aromatic solvent such as benzene, toluene, and xylene; a mixed solvent of 1,1,2-trichloro-1,2,2-trifluoroethane with methylene chloride; an ester-based solvent such as ethyl acetate; an aliphatic hydrocarbon or the like, and benzene and toluene or the like, which suitably function as a good solvent for both of the monomers and the polymerization initiator and also function as a bad solvent for the copolymer to be produced, are usually used.

However, in the third aspect of the present invention, the polymerization is conducted in the presence of solvents which dissolve the copolymer of an alkyl vinyl ether/maleic anhydride, and separation of the solvents can be conducted by using the distillation or the like after completion of the reaction, or the separation can be conducted by using a method to add a bad solvent on the way of the copolymerization process, after deposition of the copolymer to be obtained by polymerizing in the presence of a good solvent for the copolymer, as described in the first aspect of the present invention.

As the polymerization initiators, aforesaid various ones may be used, and these initiators are not particularly limited, if these are soluble in the above-mentioned solvents. Namely, examples of the initiators include a peroxide such as lauryl peroxide; an azo compound such as azobisisobutyronitrile or the like, as mentioned in the first aspect of the present invention, and among them, lauryl peroxide or the like is preferably used. These initiators may be optionally mixed with a reducing agent to enhance a polymerization-rate.

In a method for producing a copolymer according to the present invention, any of the reaction process such as a batch process, a semi-batch process, or a continuous process may be adopted. As the reaction pressure, any of a normal pressure, a compressed or a pressure-reduced condition may be used, and as a reaction atmosphere, an inert gas such as a nitrogen gas is usable. Raw materials, solvents and a reaction-atmosphere are preferably deoxidized or replaced with an inert gas.

Hereinafter, a producing method according to the third aspect of the present invention will be explained, referring to the case where the reaction is carried out in a batch system using a solvent which does not dissolve the copolymer of an alkyl vinyl ether/maleic anhydride.

Firstly, a maleic anhydride solution, obtained by dissolving a total amount of maleic anhydride to be used for a polymerization reaction in a solvent, is fed into a polymerization vessel. An amount of the solvent to be used is preferably 75 to 95% by weight, particularly preferably 85 to 95% by weight based on the total amount of maleic anhydride, alkyl vinyl ether, and the solvent to be fed for the polymerization reaction. The solvent is used partly as a solvent for dissolution of the aforesaid polymerization initiator, and used most partly as preparation of the above maleic anhydride solution. The above polymerization vessel is equipped with an each inlet for the alkyl vinyl ether solution and the polymerization-initiator solution, and further, is desirably provided with a usual agitator and a reflux condenser.

In the present invention, it is necessary and important for an agitation-operation, as described below, to conduct so as to avoid contacting of only the maleic anhydride solution with the polymerization initiator, and moreover, to conduct a polymerization reaction homogeneously. But, kinds of the agitators are not specifically restricted. Further, in the present invention, the reflux condenser is not always necessary, since the feeding of the alkyl vinyl ether is slow, and the amount of the alkyl vinyl ether to directly come in contact with atmosphere is a little if it is fed from the bottom part of polymerization vessel. However, the reflux condenser is preferably equipped with, because of the reason that the boiling point of the alkyl vinyl ether at a normal pressure is low as being at 5 to 6° C., even a little amount of the diffusion thereof by volatilization is unfavorable due to its high cost, and heat removal is needed.

The above-mentioned maleic anhydride solution in the polymerization vessel is gradually heated from an ordinary temperature, and is preferably heated up to about 80° C. Under being kept at this temperature, addition of one portion of alkyl vinyl ether starts before the addition of polymerization-initiator solution. Total amount of both the monomers to be used for producing the copolymer of the alkyl vinyl ether/maleic anhydride is most preferably 1:1, but the amount is changeable in the range of 1/0.6 to 1/3.0 by weight ratio of the maleic anhydride/alkyl vinyl ether, as explained in the aforesaid first aspect of the present invention.

The amount of the alkyl vinyl ether monomer to be added, before the start of addition of polymerization-initiator solution, is preferably 1150 to 1/5, more preferably 1/30 to 1/5, and most preferably 1/10 to 1/5 based on the total amount thereof used. When the addition amount of the alkyl vinyl ether monomer, at the first period, is less than 1/50, a polymer rich in maleic anhydride other than an alternative copolymer will be prone to be produced, due to its too reduced amount, by the addition of polymerization initiator. Whereas, when the adding amount exceeds 1/5, volatilized amount of the alkyl vinyl ether monomer will increase, and the monomer existing in the liquid phase will not increase, thereby resulting in being meaningless of feeding.

After one portion of total alkyl vinyl ether monomer is added to the maleic anhydride solution and is homogeneously dissolved therein, addition of the polymerization initiator will start, and the residual portion of the alkyl vinyl ether monomer is added in parallel with each other. Although it is not always necessary to add both of the polymerization-initiator solution and the residual portion of the alkyl vinyl ether monomer in parallel with each other and continuously, addition of the two portions over a long period of time or preferably over 5 hours is desirable. Further, both of the residual portion of the alkyl vinyl ether monomer and the polymerization initiator are preferably added through a different feeding mouth from each other, so as to avoid a direct contacting of the two at the time of feeding. After completion of the addition of the residual portion of an alkyl vinyl ether monomer and the polymerization initiator, the polymerization reaction of an alkyl vinyl ether with maleic anhydride will almost be finished, but it is favorable to further keep the reaction system, as it is, over 0.5 to 2 hours.

According to the above-mentioned method, an alternative copolymer of an alkyl vinyl ether/maleic anhydride dispersed in a solvent can be obtained. Subsequently, a reaction mass of the copolymer thus obtained in the polymerization process is subjected to treatment in the posterior processes to the polymerization process such as a solvent-removal process and a drying process, and optionally, to a granulation process, a mixing process, a transportation process, and a storage process and the like.

The reaction mass is fed to the solvent-removal process to remove the copolymer from the solvent. When the reaction mass is a dispersion solution of the copolymer, a conventional separation means such as a specific gravity separation, filtration, centrifugal separation, and distillation may be employed. For example, the dispersion liquid is subjected to a centrifugal separator to remove a solvent, and a complete removal of the solvent is performed in a subsequent drying process.

No specific limitation is put on the kind of a dryer used in the drying process, and any of a continuous system dryer or a batch system dryer may be used. Examples of the dryer include a box type dryer, a vacuum box type dryer, a tunnel dryer, a nozzle jet dryer, a band dryer, a turbo vertical type dryer, a vertical dryer, a rotary dryer, a ventilation-rotary dryer, a rotary dryer with a steam heating tube-bundle, a groove type agitating dryer, a fluidized-bed dryer, a drum dryer, a multistage-disk dryer, a multi-cylinder dryer and the like.

An example of the drying operation method will be explained referring to the heat conductive agitation-cone type vacuum dryer. Incidentally, this type of dryer is exemplified by a Ribbocone dryer (produced by Ohkawara Seisakusho Co. Ltd.) and Nauter type dryer (Hosokawamicron Co. Ltd.). The conductive heat agitation-cone type vacuum dryer is generally heated and reduced in pressure from a viewpoint of productivity. The heating is most suitably controlled in proportion to the boiling point of the aforesaid solvent to be used. For example, in case when benzene is used which is described hereinabove, it is desirable to control a temperature of the heat medium at 80° C. to 150° C., and the degree of reduced pressure is controlled at 5 kPaA (A denotes absolute pressure) or lower, preferably at 2.5 kPaA or lower in vacuum, from a viewpoint of both productivity and energy saving. The drying time is not particularly limited, but in case of this dryer, the drying time under heated and pressure-reduced conditions generally needs to be 5 to 15 hours.

In the case when no oxygen exists in the dryer, the specific viscosity in the copolymer of an alkyl vinyl ether/maleic anhydride will not entirely lower, but the present inventors have found that a conspicuous lowering of the specific viscosity will happen if even a minor amount of oxygen (e.g., 0.5%) exists. The reaction mechanism therefore is not clear, but it is qualitatively thought that oxygen molecule will cause a depolymerization in the copolymer of an alkyl vinyl ether/maleic anhydride to lower the molecular weight thereof.

It is therefore necessary to conduct an operation to reduce pressure in the dryer, for example, to not more than 1 kPaA ("A" means absolute pressure), preferably to not more than 0.2 kPaA using a vacuum pump before drying with a dryer, and then, to repeat replacement of oxygen with an inert gas (a nitrogen, an argon gas or the like), for example, by three or four times to completely remove oxygen from the system in dryer. Namely, the oxygen concentration (as converted to a normal pressure) in the system is not more than 0.1%, preferably not more than 0.05%, most preferably not more than 0.01%.

The oxygen concentration in the system may be measured by a method to use a portable electrode type oxygen-concentration meter, or by a method in which a gas in the system is sampled into a tetra bag etc. and analyzed for oxygen by a gas chromatography or the like method. When the oxygen concentration in a dryer is within the above-range, the specific viscosity in the copolymer of an alkyl vinyl ether/maleic anhydride obtained in a state of a solution will not lower even if it is dried, for example, at 140° C., whereas the specific viscosity of the copolymer will logarithmically lower with enhancement of the oxygen concentration and the heating temperature, or with extension of heating time in the dryer. Accordingly, the lowering of the specific viscosity by heating can be prevented by adjusting these oxygen concentration, heating temperature, or heating period of time.

In case of drying under a reduced pressure in a dryer, it is required to set up an apparatus into which air does not enter through a joint of flanges or the like. For that purpose, leakage from the flanges or the like must be avoided by using the materials resistant to a high vacuum at the packing of the flange parts, by providing no flanges in some cases or by using a welding method. In such a case when being difficult to prevent the joint parts from invasion of air, it is possible to enclose the joint-surroundings with an air-tight box, and to enable the inside of the box to be in a nitrogen atmosphere.

An leakage (invasion in) test of air is made as follows: Inside of the dryer is pressurized, for example, to 100 to 200 kPa G ("G" shows a gauge pressure) by an inert gas (nitrogen and argon, etc.), and allowed to stand for 10 minutes or more. After that, an aqueous soap liquid is sprayed thereon and a foamed state is observed. Usually, it can be said that $10^{-3}$ to $10^{-4}$ liter.mm Hg/s of the leakage amount can be detected (refer to the publication titled as "Technology on High Pressure Gas and Security" by High Pressure Gas and Security Association).

Following the drying process, the copolymer obtained, is optionally subjected to a granulation process to obtain a flake, a blending process, a transportation process, a storage process and the like. In these processes, it is also desirable to apply the oxygen concentration corresponding to such a condition as in the above-drying process, if the heating temperature is 60° C. or higher.

In case when the copolymer obtained is made into a different form or shape from the powder, and in case when, for example, the copolymer is granulated singly or as a mixture of the polymer and other polymers or additives into flakes or the like, it is also needed to employ the lower oxygen concentration in proportion to rise of the heating temperature. In the transportation process, the storage process and the like, there is a similar tendency. For example, if stored in a powdery state and in contact with air under an atmospheric pressure, lowering of the specific viscosity will be observed in two days or so at 60° C., and will lower to a half-value thereof in 12 hours. If heated in a liquid state, it is further required to give a careful consideration to the oxygen concentration.

Accordingly, if heated at 60° C. or higher in the posterior processes to the polymerization process, oxygen concentration in an atmosphere, although the concentration depends on the kind of phase and heating time, is desirably 0.1% or lower as converted to a normal pressure, 0.05% or lower at 80° C. or higher, and 0.01% or lower at 100° C. or higher, respectively. On the contrary, a copolymer of an alkyl vinyl ether/maleic anhydride having a desired specific viscosity may be produced by conducting a molecular-weight reduction of the copolymer through utilization of the above-phenomenon. For example, it is possible to produce a copolymer having a specific viscosity of 1 by heating the copolymer having a specific viscosity of 5 up to 150° C. in an atmosphere over several hours.

In general, conditions suitable for the reduction of a molecular weight are under an oxygen concentration of 0.5 to 30% (as converted to a normal pressure), at a heating temperature of 60 to 200° C., and for a heating time of 0.1 to 48 hours. When the oxygen concentration (as converted to a normal pressure) is too lower than 0.5%, it will take too much time for the reduction of molecular weight, whereas when the oxygen-concentration is too high, fear of a fire or the like will occur. The heating temperature of too lower than 60° C. results in taking too much time for the reduction of molecular weight, whereas the heating temperature of too higher than 200° C. is prone to bring about discoloration or the like.

A specific viscosity of the resulting product obtained as above is not specifically limited, and a copolymer product having a specific viscosity of 0.5 to 5 can be obtained by using the copolymer of alkyl vinyl ether/maleic anhydride having, for example, a specific viscosity of 3 to 6 as a starting raw material.

EXAMPLES

In the following, the present invention will be described in more detail with reference to working Examples and Comparative Examples, which however shall not limit the present invention thereto. In the following Examples and Comparative Examples, "%" in relation to a gas denotes "volume/volume %". In each of Examples, the reaction was completed in a prescribed time and the maleic anhydride was not detected in the reaction-solution.

Example 1

In a 3-liter reaction vessel equipped with an agitator, a reflux condenser, and an inner temperature controlling device, charged and dissolved were 122.13 g of maleic anhydride and 2000 ml (about 1760 g) of ethyl acetate, and then, an inner part temperature of the reaction vessel was kept at 70° C. As a polymerization-initiator, 227 ml (200 g) of an ethyl acetate solution containing 0.249 g of lauroyl peroxide was continuously fed into the reaction vessel in a speed of 14.27 ml/hour, followed by continuously feeding methyl vinyl ether from the bottom of the reaction vessel in a speed of 25.25 ml/hour until completion of the reaction.

After the reaction was conducted for 7 hours, the inside of the reaction vessel was kept at 70° C. to obtain an ethyl acetate slurry-solution of a copolymer, and thereafter, the slurry-solution obtained was once cooled to 25° C. to obtain a homogeneous ethyl acetate solution of a copolymer. Incidentally, the weight ratio of ethyl acetate/maleic anhydride, which was used at the time of the polymerization, was 122.13:(1760+88)=1:15.1. Further, the weight percentage of lauroyl peroxide/maleic anhydride, which was used at the time of the polymerization, was 130 mg/122.13 g=about 0.1%.

Next, in order to remove the solvent from the slurry, the slurry was heated up to 70° C. at inner temperature of the reaction vessel, and then, ethyl acetate was distilled out to obtain a white fine solid-state product. During the distillation, attention was paid upon a temperature and a reduced pressure degree of the jacket so as to maintain the inner temperature at higher than 70° C. by heating. Specific viscosity of the resultant copolymer was 2.60, and concentration of ethyl acetate remaining in the copolymer was 0.1% by weight or less.

Comparative Example 1

The ethyl acetate slurry-solution of the copolymer obtained in Example 1, maintained at 70° C., was cooled down to 25° C. to obtain a homogeneous ethyl acetate solution of the copolymer. Subsequently, ethyl acetate which is a solvent was removed from the homogeneous copolymer solution at temperature of 25° C., by maintaining the inner temperature of the copolymer solution at 40° C. or lower under a reduced pressure, but the copolymer resin thus obtained was in a glassy state and adhered to the wall of reaction vessel. Moreover, as a result of quantitative analysis for ethyl acetate concentration remaining in the copolymer, it was 0.5% by weight.

Example 2

In a 3-liter reaction vessel equipped with an agitator, a reflux condenser, and an inner temperature controlling device, charged and dissolved were 122.13 g of a maleic anhydride and 2000 ml (about 1760 g) of ethyl acetate, and then, an inner part temperature of the reaction vessel was kept at 70° C.

As a polymerization-initiator, 227 ml (2.00 g) of an ethyl acetate solution containing 0.22 g of lauroyl peroxide was continuously fed into the reaction vessel in a speed of 25.25 ml/hour, followed by continuously feeding methyl vinyl ether from the bottom of reaction vessel in a speed of 25.25 ml/hour until completion of the reaction.

After the reaction was conducted for 8 hours, inside of the reaction vessel was kept at 70° C. to obtain an ethyl acetate slurry-solution of the copolymer, and thereafter, the slurry-solution obtained was once cooled to 25° C. to obtain a homogeneous ethyl acetate solution of the copolymer. Incidentally, the weight ratio of ethyl acetate/maleic anhydride, which was used at the time of the polymerization, was 122.13:(1760+100)=1:15.2, and the weight ratio of methyl vinyl ether/maleic anhydride, which was used at the time of the polymerization, was 122.13:150=1:1.22. Further, the weight percentage of lauroyl peroxide/maleic anhydride, which was used at the time of the polymerization, was 110 mg/122.13 g=about 0.09%.

Next, in order to remove the solvent from the slurry, the slurry was heated up to 70° C. at inner temperature of the reaction vessel and then, ethyl acetate was distilled out to obtain a white fine solid-state product, while paying attention upon a temperature and a reduced pressure degree of the jacket so as to control the inner temperature to be at higher than 70° C. by heating. Specific viscosity of the resultant copolymer was 3.60, and concentration of ethyl acetate remaining in the copolymer was 0.1% by weight or less.

Example 3

In a 3-liter reaction vessel equipped with an agitator, a reflux condenser, and an inner temperature controlling device, charged and dissolved were 122.13 g of a maleic anhydride and 2000 ml (about 1760 g) of ethyl acetate, and then, an inner part temperature of the reaction vessel was kept at 70° C.

As a polymerization-initiator, 227 ml (200 g) of an ethyl acetate solution containing 0.147 g of lauroyl peroxide was continuously fed into the reaction vessel in a speed of 14.27 ml/hour, followed by continuously feeding methyl vinyl ether from the bottom of reaction vessel in a speed of 25.25 ml/hour until completion of the reaction.

After the reaction was conducted for 9 hours, inside of the reaction vessel was kept at 70° C. to obtain an ethyl acetate slurry-solution of the copolymer, and thereafter, the slurry-solution obtained was once cooled to 25° C. to obtain a homogeneous ethyl acetate solution of the copolymer.

Incidentally, the weight ratio of ethyl acetate/maleic anhydride, which was used at the time of the polymerization, was 122.13:(1760+113)=1:15.3, and the weight ratio of methyl vinyl ether/maleic anhydride, which was used at the time of the polymerization, was 122.13:168=1:1.38. Further, the weight percentage of lauroyl peroxide/maleic anhydride, which was used at the time of the polymerization, was 83 mg/122.13 g=about 0.07%.

Next, in order to remove the solvent from the slurry, the slurry was heated up to 70° C. at inner part temperature of the reaction vessel and then, ethyl acetate was distilled out to obtain a white fine solid-state product, while paying attention upon a temperature and a reduced pressure degree of the jacket so that the inner temperature was adjusted at higher than 70° C. by heating. Specific viscosity of the resultant copolymer was 4.30, and concentration of ethyl acetate remaining therein was 0.1% by weight or lower.

Example 4

In a 3-liter reaction vessel equipped with an agitator, a reflux condenser, and an inner temperature controlling device, charged and dissolved were 122.13 g of a maleic anhydride and 2000 ml (about 1760 g) of ethyl acetate, and then, an inner part temperature of the reaction vessel was kept at 70° C. As a polymerization-initiator, 227 ml (200 g) of an ethyl acetate solution containing 0.088 g of lauroyl peroxide was continuously fed into the reaction vessel in a speed of 14.27 ml per an hour, followed by continuously feeding methyl vinyl ether from the bottom of reaction vessel in a speed of 25.25 ml/hour until completion of the reaction.

After the reaction was conducted for 10 hours, the inside of the reaction vessel was kept at 70° C. to obtain an ethyl acetate slurry-solution of the copolymer, and thereafter, the slurry-solution obtained was once cooled to 25° C. to obtain a homogeneous ethyl acetate solution of the copolymer.

Incidentally, the weight ratio of ethyl acetate/maleic anhydride, which was used at the time of the polymerization, was 122.13:(1760+125)=1:15.4, and the weight ratio of methyl vinyl ether/maleic anhydride which was used at the time of the polymerization was 122.13:187=1:1.53. Further, the weight percentage of lauroyl peroxide/maleic anhydride which was used at the time of the polymerization was 55 mg/122.13 g=about 0.045%.

Next, in order to remove the solvent from the slurry, the slurry was heated up to 70° C. at inner part temperature of the reaction vessel and then, ethyl acetate was distilled out to obtain a white fine solid-state product. During the distillation, attention was paid upon a temperature ad a reduced pressure degree of the jacket so as to allow the inner temperature not to become at 70° C. or lower by heating. Specific viscosity of the resultant copolymer was 5.20, and concentration of ethyl acetate remaining therein was 0.1% by weight or lower.

Example 5

In a 3-liter reaction vessel equipped with an agitator, a reflux condenser, and an inner temperature controlling device charged and dissolved were 122.13 g of maleic anhydride and 2000 ml (about 1760 g) of ethyl acetate, and then, an inner part temperature of the reaction vessel was kept at 70° C. As a polymerization initiator, 227 ml (200 g) of ethyl acetate solution containing 0.249 g of lauroyl peroxide was continuously fed into the reaction vessel in a speed of 14.27 ml/hour, followed by continuously feeding methyl vinyl ether from the bottom of the reaction vessel in a speed of 25.25 ml/hour until completion of the reaction.

After the reaction was conducted for 7 hours, the inner part of the reaction vessel was maintained at 70° C. to obtain an ethyl acetate slurry-solution of the copolymer. Thereafter, the slurry was once cooled down to 25° C. to obtain a homogeneous ethyl acetate solution of the copolymer. Incidentally, the weight ratio of ethyl acetate/maleic anhydride which was used at the time of polymerization was 122.13:(1760+88)=1:15.1, and the weight ratio of methyl vinyl ether/maleic anhydride which was used at the time of polymerization was 122.13:130.73=1:1.07. Further, the weight percentage of lauroyl peroxide/maleic anhydride which was used at the time of polymerization was 130 mg/122.13 g=about 0.1%.

In order to remove the solvent from the slurry, ethyl acetate was distilled out, while paying attention upon a temperature and a reduced pressure degree of the jacket so as to allow the inner temperature of reaction vessel not to be at 70° C. or lower by heating. And also, 300 g of cyclohexane was gradually added at the time when 1000 g of ethyl acetate was distilled out, and further, the solvent removal under reduced pressure was continued, thereby to obtain a white powder-state product. In case of this Example, the copolymer thus precipitated gave a white finer solid and handling of the slurry led to be easier, as compared with the case in Example 1 wherein the cyclohexane was not used. Specific viscosity of the resultant copolymer was 2.60 and total concentration of ethyl acetate and cyclohexane remained in the copolymer was 0.1% by weight or lower.

Example 6

In a 3-liter reaction vessel equipped with an agitator, a reflux condenser, and an inner temperature controlling device, charged and dissolved were 122.13 g of maleic anhydride and 2000 ml (about 1760 g) of ethyl acetate, and then, an inner part temperature of the reaction vessel was kept at 70° C.

As a polymerization initiator, 227 ml (200 g) of ethyl acetate solution containing 0.221 g of lauroyl peroxide was continuously fed into the reaction vessel in a speed of 14.27 ml/hour, followed by continuously feeding methylvinyl ether from the bottom of the reaction vessel in a speed of 25.25 ml/hour until completion of the reaction.

After the reaction was conducted for 8 hours, the inner part of the reaction vessel was maintained at 70° C. to obtain an ethyl acetate slurry-solution of the copolymer. Thereafter, the slurry obtained was once cooled down to 25° C. to obtain a homogeneous ethyl acetate solution of the copolymer. Incidentally, the weight ratio of ethyl acetate/maleic anhydride, which was used at the time of polymerization, was 122.13:(1760+100)=1:15.2, and the weight ratio of methyl vinyl ether/maleic anhydride, which was used at the time of polymerization, was 122.13:150=1:1.22.

Further, the weight percentage of lauroyl peroxide/maleic anhydride, which was used at the time of polymerization, was 110 mg/122.13 g=about 0.09%.

In order to remove the solvent from the slurry, ethyl acetate was distilled out, and also, 300 g of toluene was gradually added at the time when 1000 g of ethyl acetate was distilled out, and further, the solvent removal under reduced pressure was continued, thereby, obtaining a white powder-state product.

During the distillation, attention was paid upon a temperature and a reduced pressure degree of the jacket so as to allow the inner temperature of reaction vessel to be at higher than 70° C. by heating.

In case of this Example, the copolymer thus precipitated gave a still finer solid and handling of the slurry led to be easier, as compared with the case in Example 2 in which toluene was not used. Specific viscosity of the resultant copolymer was 3.60 and total concentration of ethyl acetate and toluene remained in the copolymer was 0.1% by weight or lower.

Example 7

In a 3-liter reaction vessel equipped with an agitator, a reflux condenser, and an inner temperature controlling device, charged and dissolved were 122.13 g of maleic anhydride and 2000 ml (about 1760 g) of ethyl acetate, and then, an inner part temperature of the reaction vessel was kept at 70° C.

As a polymerization initiator, 227 ml (200 g) of ethyl acetate solution containing 0.147 g of lauroyl peroxide was continuously fed into the reaction vessel in a speed of 14.27 ml per an hour, followed by continuously feeding methyl vinyl ether from the bottom of the reaction vessel in a speed of 25.25 ml/hour until completion of the reaction.

After the reaction was conducted for 9 hours, the inner part of the reaction vessel was maintained at 70° C. to obtain an ethyl acetate slurry-solution of the copolymer. Thereafter, the slurry was once cooled down to 25° C. to obtain a homogeneous ethyl acetate solution of the copolymer. Incidentally, the weight ratio of ethyl acetate/maleic anhydride, which was used at the time of polymerization, was 122.13:(1760+113)=1:15.3, and the weight ratio of methyl vinyl ether/maleic anhydride, which was used at the time of polymerization, was 122.13:168=1:1.38.

Further, the weight percentage of lauroyl peroxide/maleic anhydride, which was used at the time of polymerization, was 83 mg/122.13 g=about 0.07%.

In order to remove the solvent from the slurry, ethyl acetate was distilled out, and also, 300 g of cyclohexane was gradually added at the time when 1000 g of ethyl acetate was distilled out, and further, the solvent removal under reduced pressure was continued, thereby, obtaining a white powder-state product. During the distillation, attention was paid upon a temperature and a reduced pressure degree of the jacket so as to maintain the inner temperature of reaction vessel at higher than 70° C. by heating.

In case of this Example, the copolymer thus precipitated showed a still finer solid and handling of the slurry led to be easier, as compared with the case of Example 3 in which cyclohexane was not used. Specific viscosity of the resultant copolymer was 4.3 and total concentration of ethyl acetate and toluene remained in the copolymer was 0.1% by weight or lower.

Example 8

In a 3-liter reaction vessel equipped with an agitator, a reflux condenser, and an inner temperature controlling device, charged and dissolved were 122.13 g of maleic anhydride and 2000 ml (about 1760 g) of ethyl acetate, and then, an inner part temperature of the reaction vessel was kept at 70° C.

As a polymerization initiator, 227 ml (200 g) of ethyl acetate solution of 0.088 g of lauroyl peroxide was continuously fed into the reaction vessel in a speed of 14.27 ml per an hour, followed by continuously feeding methyl vinyl ether from the bottom of the reaction vessel in a speed of 25.25 ml/hour until completion of the reaction.

After the reaction was conducted for 10 hours, the inner part of the reaction vessel was maintained at 70° C. to obtain a copolymer slurry-solution in ethyl acetate. Thereafter, the slurry-solution was once cooled down to 25° C. to obtain a homogeneous ethyl acetate solution of the copolymer. Incidentally, the weight ratio of ethyl acetate/maleic anhydride, which was used at the time of polymerization, was 122.13:(1760+125)=1:15.4, and the weight ratio of methyl vinyl ether/maleic anhydride, which was used at the time of polymerization, was 122.13:187=1:1.53.

Further, the weight percentage of lauroyl peroxide/maleic anhydride, which was used at the time of polymerization, was 55 mg/122.13 g=about 0.045%.

In order to remove the solvent from the slurry, ethyl acetate was distilled out, while paying attention on a temperature and a reduced pressure degree of the jacket so as to allow the inner temperature of reaction vessel to be at higher than 70° C. by heating. And also, 300 g of cyclohexane was gradually added at the time when 1000 g of ethyl acetate was distilled out, and further, the solvent removal under reduced pressure was continued, thereby, obtaining a white powder-state product.

In case of this Example, the copolymer thus precipitated gave a still finer solid and handling of the slurry led to be easier, as compared with the case of Example 4 in which cyclohexane was not used.

Specific viscosity of the resultant copolymer was 5.30 and total concentration of ethyl acetate and toluene remained in the copolymer was 0.1% by weight or lower.

As is clear in the above results, according to the first aspect of the present invention, the copolymer, which is in a finely solidified state and contains a little amount of a solvent remaining therein, can be obtained by a precipitation-polymerization, in an inexpensive solvent which is harmless to the human body, and without sticking of the copolymer to the wall of reaction vessel during the reaction.

Example 9

In a 30 ml glass ampoule, charged was 5 g of a copolymer of methyl vinyl ether/maleic anhydride having a specific viscosity of 4.8, and then, the ampoule was equipped with a three-way cock, made be in a vacuum state using a pressure-reducing pump, replaced with a nitrogen gas, and sealed to prepare a sample ampoule. The nitrogen gas used here was 99% in purity and with oxygen concentration of 0%, as the result of a gas chromatography analysis. In order to carry out a test for change in an elapsed time, three bottles of the sample ampoule thus prepared were allowed to stand for 4, 8 or 12 hours at 110° C. in a thermostatically-controlled vessel, and then, specific viscosity of the copolymer of the methyl vinyl ether/maleic anhydride in the ampoule was measured.

The results obtained are given in Table 1.

Example 10

The procedures in Example 9 were repeated to conduct a test for change in an elapsed time, except that the temperature in a thermostatically-controlled vessel was set at 140° C., and specific viscosity of each sample was measured. The results obtained are given in Table 1.

Comparative Example 2

The procedures in Example 9 were repeated to conduct a test for change in an elapsed time, except that such gas as prepared so that it is maintained at 0.5% of oxygen and 99.5% of nitrogen, by measuring with a gas chromatography analysis, was used as a gas for replacing. The results obtained are given in Table 1.

Comparative Example 3

The procedures in Example 9 were repeated to conduct a test for change in an elapsed time, except that the gas which was prepared so that it is maintained at 2% of oxygen and 98% of nitrogen, by measuring with a gas chromatography analysis, was used as a gas for replacing. The results obtained are given in Table 1.

Comparative Example 4

The procedures in Example 9 were repeated to conduct a test for change in an elapsed time, except that the gas, prepared so that it is maintained at 21% of oxygen and 79% of nitrogen by measuring with a gas chromatography analysis, was used as the gas for replacing. The results obtained are given in Table 1.

Comparative Example 5

The procedures in Comparative Example 4 were repeated to conduct a test for change in an elapsed time, except that the temperature of the thermostatically-controlled vessel was set at 120° C.

The results obtained are given in Table 1.

Comparative Example 6

The procedures in Comparative Example 4 were repeated to conduct a test for change in an elapsed time, except that the temperature of the thermostatically-controlled vessel was set at 140° C.

The results obtained are given in Table 1.

Figure 2:
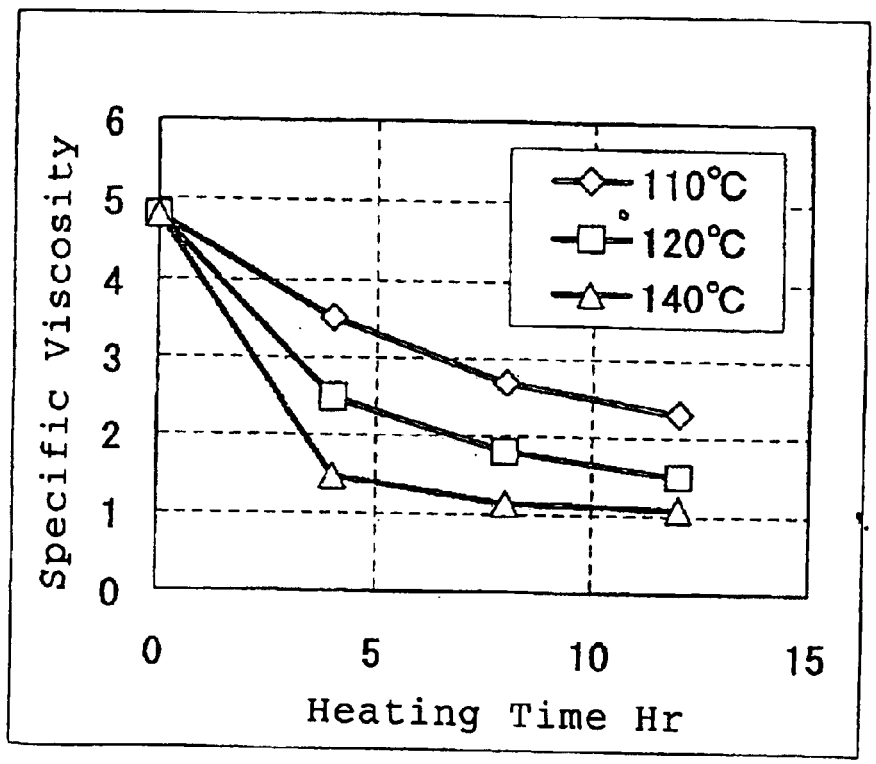
FIG. 2 is a graph showing a relationship between heating time and specific viscosity of the copolymer of methyl vinyl ether/maleic anhydride, at 110° C., 120° C. and 140° C., respectively, under oxygen concentration of 21% or less.
Figure 3:
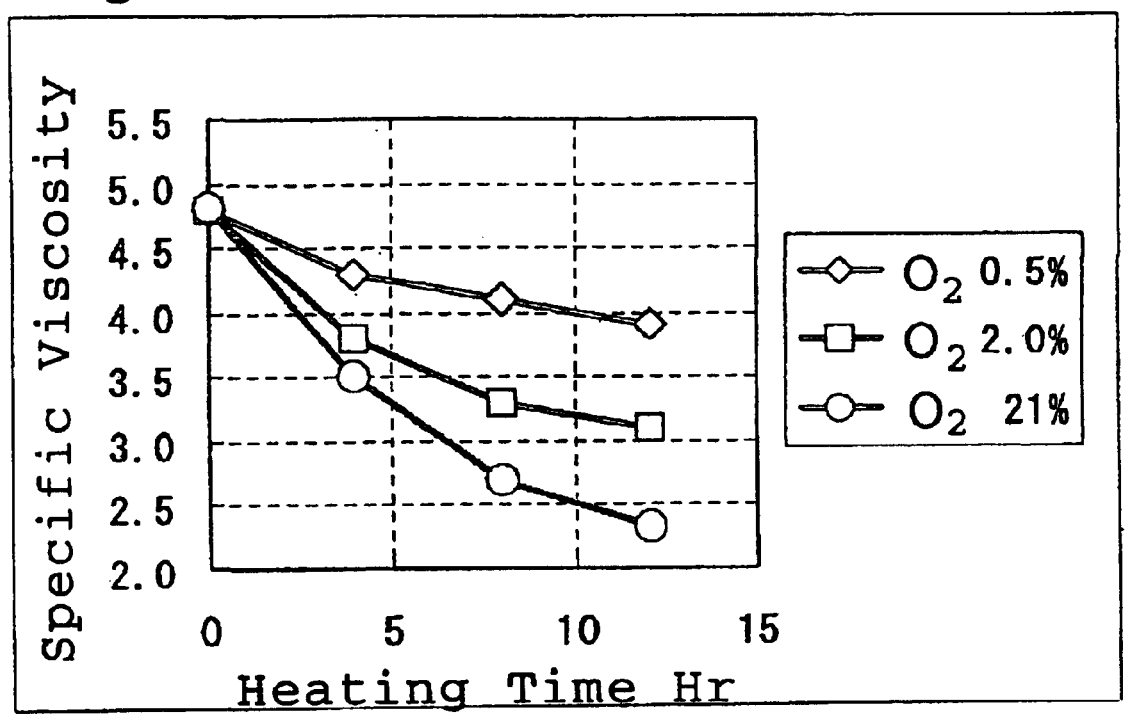
FIG. 3 is a graph showing a relationship between heating time and specific viscosity of the copolymer of methyl vinyl ether/maleic anhydride (dependency on an oxygen concentration), at 110° C., under oxygen concentration of 0.5%, 2.0% and 21%.

In addition, a graph of relationship between a heating time and a specific viscosity at 110° C. and 140° C. under substantial absence of oxygen (detectable low limit is 0.001%) is shown in FIG. 1, in which the horizontal axis represents hour (hr) and the vertical axis represents a specific viscosity ($\eta$) including the following FIGS. 2 and 3.

A graph of relationship between a heating time and a specific viscosity at 110° C., 120° C. and 140° C. under an oxygen concentration of 21% or less is shown in FIG. 2.

A graph of relationship between a heating time and a specific viscosity 110° C. under an oxygen concentration of 0.5%, 2.0%, 21% is shown in FIG. 3.

TABLE 1

| | Test Condition | | Specific Viscosity | | | |
|---|---|---|---|---|---|---|
| | Ox. Conc. | Temp. | 0 hr. | 4 hr. | 8 hr. | 12 hr. |
| Ex. 9 | 0% | 110° C. | 4.8 | 4.8 | 4.9 | 4.9 |
| Ex. 10 | 0% | 140° C. | 4.8 | 5.0 | 5.0 | 5.0 |
| Com. EX. 2 | 0.5% | 110° C. | 4.8 | 4.3 | 4.1 | 3.9 |
| Com. EX. 3 | 2% | 110° C. | 4.8 | 3.8 | 3.3 | 3.1 |
| Com. EX. 4 | 21% | 110° C. | 4.8 | 3.5 | 2.7 | 2.3 |
| Com. EX. 5 | 21% | 120° C. | 4.8 | 2.5 | 1.8 | 1.5 |
| Com. EX. 6 | 21% | 140° C. | 4.8 | 1.5 | 1.1 | 1.1 |

In the Table 1, Ox. Conc. represents "oxygen concentration", and Temp. represents "temperature".

What is claimed is:

1. A method for producing a copolymer of an alkylvinyl ether and maleic anhydride which comprises conducting, in a polymerization process, a copolymerization reaction of the alkyl vinyl ether and maleic anhydride, in the presence of a solvent, using a polymerization initiator to obtain the copolymer, and after that, conducting a heating treatment of the copolymer obtained, in the posterior processes to the polymerization process, in the substantial absence of oxygen.

2. The method according to claim 1 wherein the heating treatment in the posterior processes to the polymerization process is carried out under an atmosphere of oxygen concentration of 0.5% or lower (converted into normal pressure).

3. The method according to claim 1 wherein the heating treatment in the posterior processes to the polymerization process is carried out under an inert gas atmosphere.

4. The method according to claim 1 wherein the heating temperature in the posterior processes to the polymerization process is 60° C. or higher.

5. The method according to claim 1 wherein the posterior processes to the polymerization process are a solvent removal process and/or a drying process, in addition thereto, a granulation process, a blending process, a transportation process and/or a storage process which are optionally installed.

6. The method according to claim 1 wherein the alkyl ether is methyl vinyl ether.

7. The method according to claim 1 wherein the heating treatment in the posterior processes to the polymerization process is carried out under an atmosphere of oxygen concentration of 0.1% or lower.

* * * * *